(12) United States Patent
Pan et al.

(10) Patent No.: US 8,019,395 B2
(45) Date of Patent: Sep. 13, 2011

(54) FOLDABLE MOBILE ELECTRONIC DEVICE

(75) Inventors: Jiung-Cheng Pan, Tainan (TW);
Ning-Han Nan, Taipei (TW)

(73) Assignee: Qisda Corporation, Taoyuan County (TW)

( * ) Notice: Subject to any disclaimer, the term of this patent is extended or adjusted under 35 U.S.C. 154(b) by 819 days.

(21) Appl. No.: 11/952,961

(22) Filed: Dec. 7, 2007

(65) Prior Publication Data

US 2008/0176610 A1  Jul. 24, 2008

(30) Foreign Application Priority Data

Jan. 22, 2007  (TW) .............................. 96102289 A

(51) Int. Cl.
*H04M 1/00* (2006.01)
(52) U.S. Cl. ............... 455/575.3; 455/575.1; 455/575.4; 455/575.8
(58) Field of Classification Search ............... 455/550.1, 455/567, 575.1–575.8
See application file for complete search history.

(56) References Cited

U.S. PATENT DOCUMENTS

| 2006/0135227 | A1* | 6/2006 | Chang et al. | 455/575.3 |
| 2006/0148544 | A1* | 7/2006 | Kim | 455/575.4 |
| 2006/0160584 | A1* | 7/2006 | Lee et al. | 455/575.4 |
| 2006/0252471 | A1* | 11/2006 | Pan | 455/575.4 |
| 2007/0072657 | A1* | 3/2007 | Hyun et al. | 455/575.3 |

FOREIGN PATENT DOCUMENTS

WO  WO 2006/115144 A1  11/2006

* cited by examiner

*Primary Examiner* — Dai A Phuong

(57) ABSTRACT

A foldable mobile electronic device includes a body, a top cover and a hinge. The body includes a first sliding mechanism. The top cover includes a second sliding mechanism moving between a first position and a second position relative to the body. The hinge includes a first protrusion and a second protrusion. The first protrusion corresponds to the first sliding mechanism and the second protrusion corresponds to the second sliding mechanism. When the top cover is in the first position, the hinge extends from the body and the top cover to be exposed, and when the top cover is in the second position, the hinge is accommodated in the foldable mobile electronic device.

18 Claims, 9 Drawing Sheets

FOLDABLE MOBILE ELECTRONIC DEVICE

BACKGROUND OF THE INVENTION

1. Field of the Invention

The invention relates to a foldable mobile electronic device, in particular, to a foldable mobile electronic device with a concealed hinge.

2. Description of the Related Art

FIG. 1 depicts a conventional foldable mobile electronic device 1, comprising a body 2, a top cover 3 and a hinge 4. When the foldable mobile electronic device 1 is opened, the hinge 4 interrupts the horizontal surface formed by the body 2 and the top cover 3, as shown in FIG. 2.

BRIEF SUMMARY OF THE INVENTION

The invention provides a foldable mobile electronic device with a concealed hinge. The hinge is concealed, allowing the electronic device to form a fully horizontal state when opened.

Accordingly, the invention provides a foldable mobile electronic device comprising a body, a top cover and a hinge. The body comprises a first sliding mechanism. The top cover comprises a second sliding mechanism moving between a first position and a second position relative to the body. The hinge comprises a first protrusion and a second protrusion. The first protrusion corresponds to the first sliding mechanism and the second protrusion corresponds to the second sliding mechanism. When the top cover is in the first position, the hinge extends from the body and the top cover to be exposed, and when the top cover is in the second position, the hinge is accommodated in the foldable mobile electronic device.

Preferably, the body comprises a first notch and the top cover comprises a second notch. When the top cover is in the first position, the first notch overlaps the second notch. When the top cover is in the second position, the first notch connects with the second notch and the hinge is accommodated in the first notch and the second notch.

Preferably, the foldable mobile electronic device further comprises a first magnet set and a second magnet set. The first magnet set and the second magnet set are disposed in the first notch and the second notch, respectively. When the top cover is in the first position, the first magnet set and the second magnet set are aligned vertically and attracted to each other. When the top cover is in the second position, the first magnet set and the second magnet set are aligned horizontally and attracted to each other.

Preferably, the body further comprises a first wall and the top cover further comprises a second wall. The first sliding mechanism is disposed on the first wall and the second sliding mechanism is disposed on the second wall.

Preferably, the first sliding mechanism further comprises a plurality of first tracks, and the second sliding mechanism further comprises a plurality of second tracks corresponding to the first tracks.

Preferably, the first protrusion further comprises a plurality of first protruding members, and the second protrusion further comprises a plurality of second protruding members. The first protruding members and the second protruding members are disposed in the first tracks and the second tracks, respectively. When the top cover moves from the first position to the second position, the first protruding members and the second protruding members slide in the first tracks and the second tracks, respectively.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
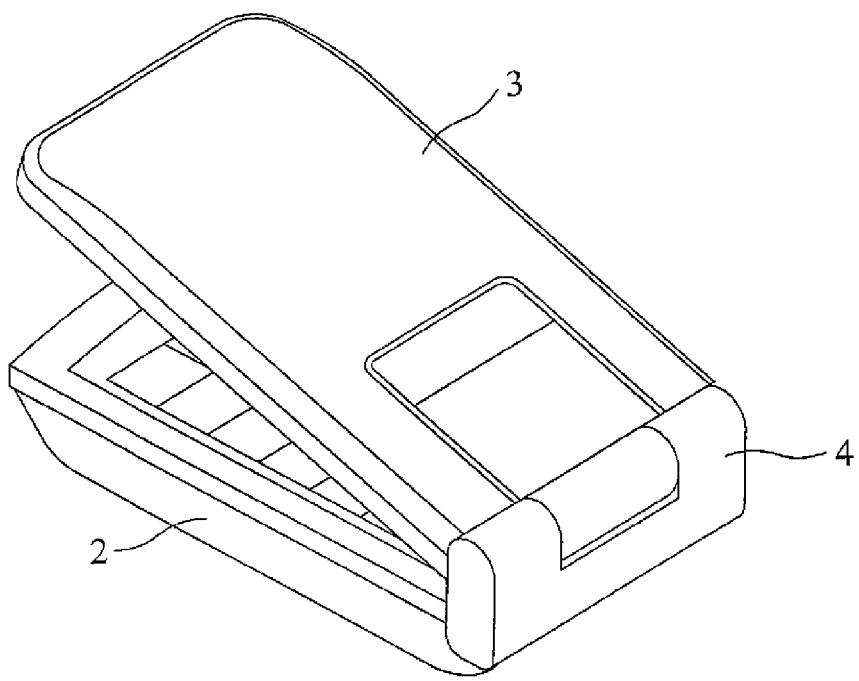
FIG. 1 is a schematic view of a conventional foldable mobile electronic device.
Figure 2:
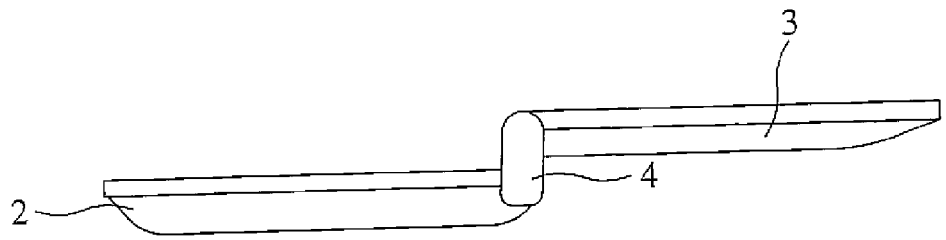
FIG. 2 is a side view of a conventional foldable mobile electronic device when opened.
Figure 3A:
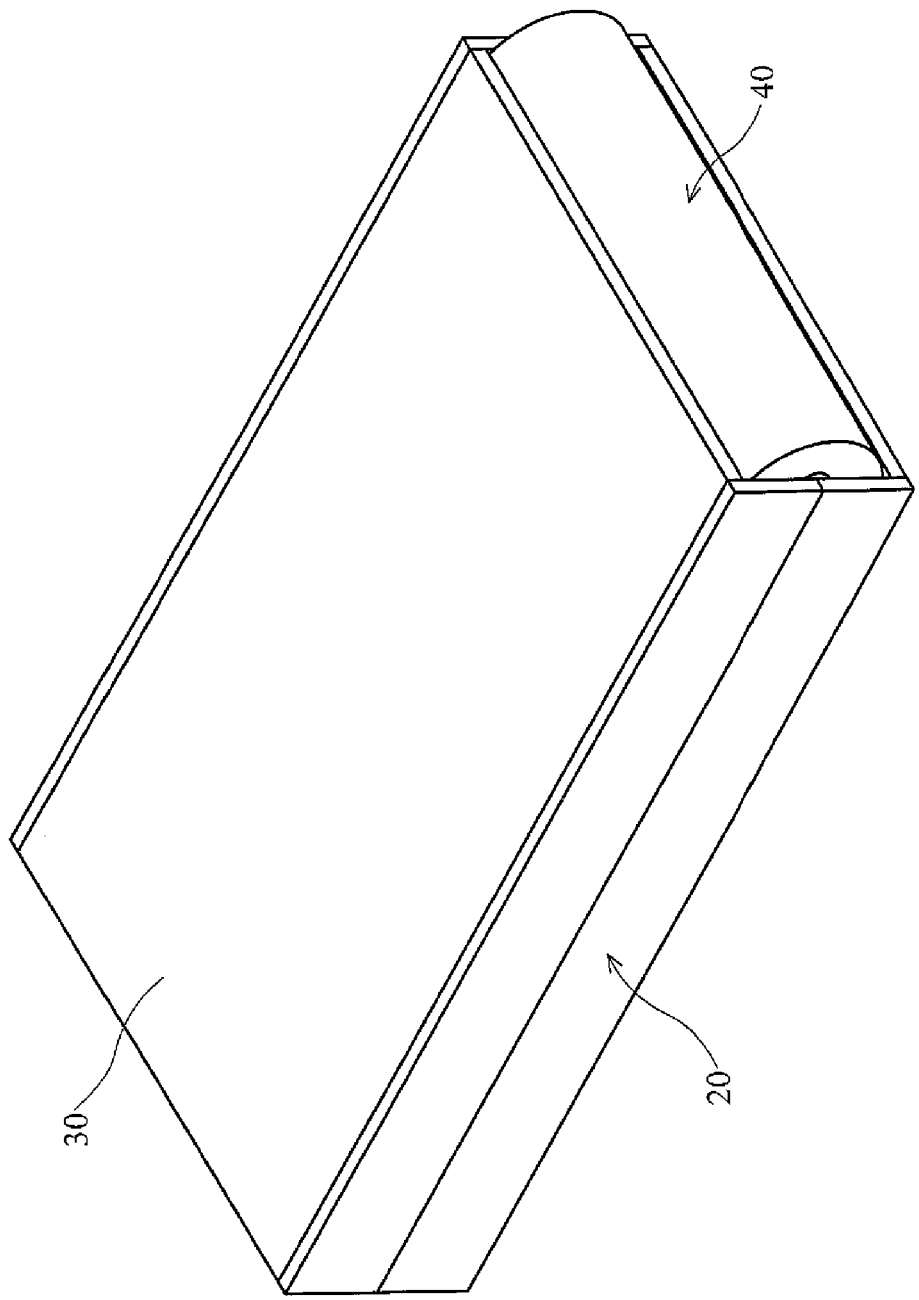
FIG. 3A is a schematic view of a foldable mobile electronic device with a concealed hinge when folded.
Figure 3B:
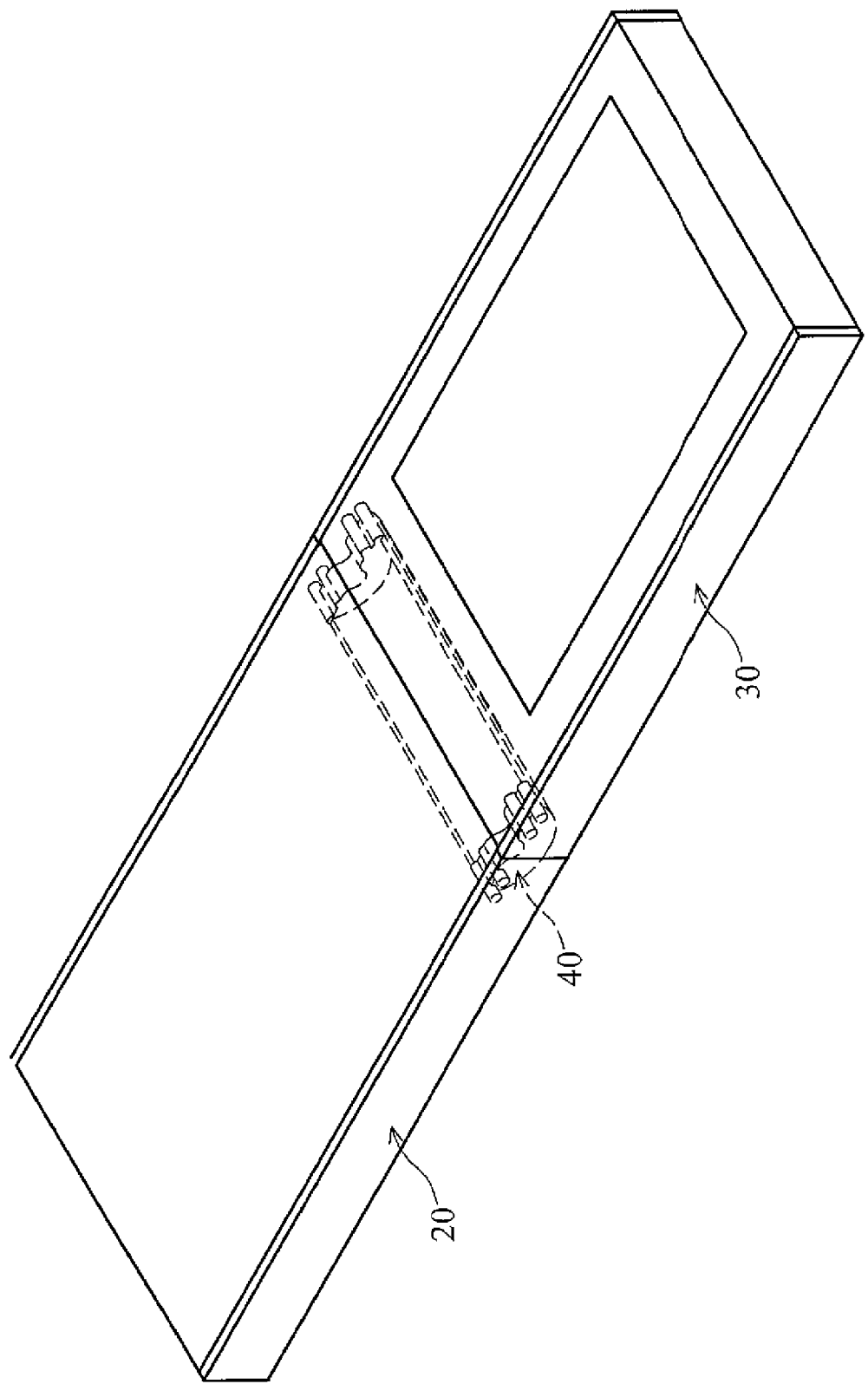
FIG. 3B is a schematic view of the foldable mobile electronic device with a concealed hinge when opened.

Referring to FIGS. 3A and 3B, a foldable mobile electronic device with a concealed hinge 10 comprises a body 20, a top cover 30 and the hinge 40. The top cover 30 movably connects with the body 20 between a foldable position (a first position hereafter, as shown in FIG. 3A) and an open position (a second position hereafter, as shown in FIG. 3B). The hinge 40 movably connects with the body 20 and the top cover 30. When the top cover 20 is in the first position, the hinge is exposed out of the body 20 and the top cover 30. When the top cover 30 moves between the first position and the second position, the hinge 40 slides between the body 20 and the top cover 30. When the top cover 30 is in the second position, the hinge 40 is accommodated in the foldable mobile electronic device 10.

Figure 4A:
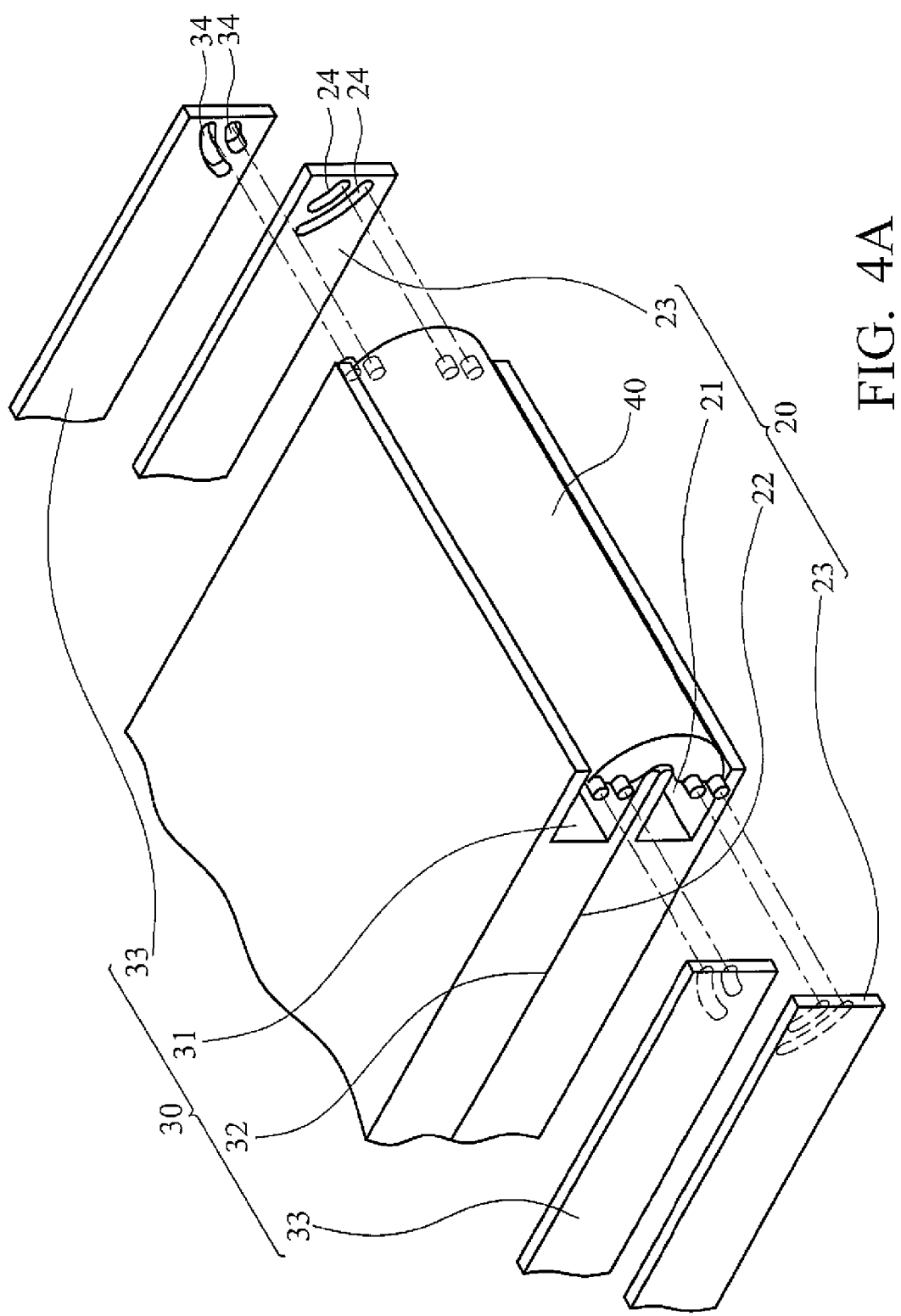
FIG. 4A is an exploded view of the foldable mobile electronic device with a concealed hinge when folded.
Figure 4B:
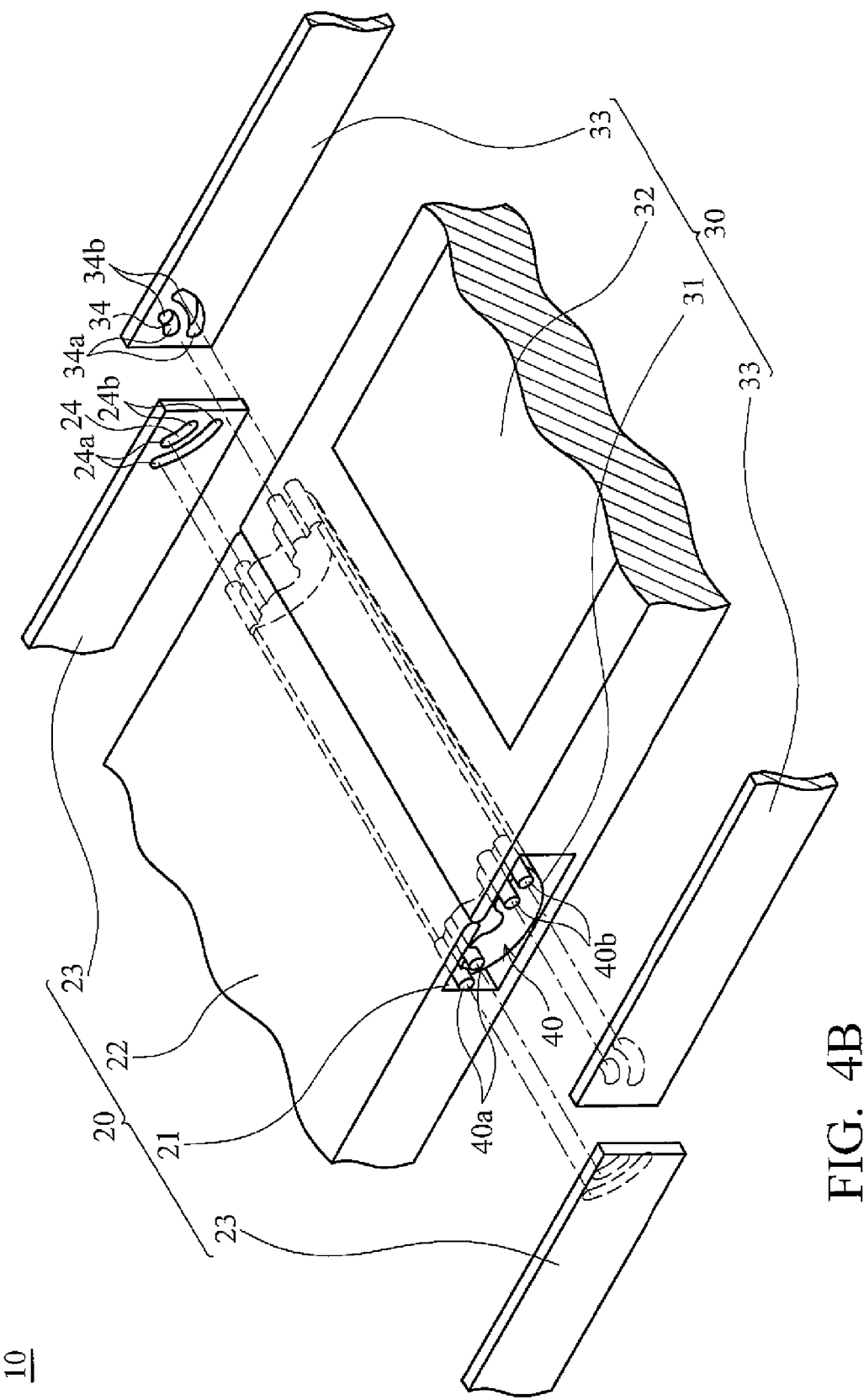
FIG. 4B is an exploded view of a foldable mobile electronic device with a concealed hinge in an opened condition.

Referring to FIGS. 4A and 4B, the body 20 comprises a first notch 21, a first surface 22 and two first walls 23, and the top cover 30 comprises a second notch 31, a second surface 32 and two second walls 33. The first notch 21 corresponds to the second notch 32. The first surface 22 and the second surface 32 adjacently connect with the first walls 23 and the second walls 33, respectively.

When the top cover 30 is in the first position, such that the foldable mobile electronic device 10 is folded, the first surface 22 overlaps the second surface 32 and the first notch 21 overlaps the second notch 31, allowing the hinge 40 to be exposed out of the body 20 and the top cover 30.

When the top cover 30 is in the second position, such that the foldable mobile electronic device 10 is open, the first surface 21 connects with the second surface 31 to form a first coplanar, and the first wall 23 connects with the second wall 32 to form a second coplanar, allowing the first notch 21 to connect with the second notch 32, such that the hinge 40 can be accommodated in the first notch 21 and the second notch 31.

Referring to FIG. 4A, the body 20 further comprises a first sliding mechanism. The first sliding mechanism comprises four first tracks 24, wherein each of the first walls 23 comprises two first tracks 24. The top cover 30 further comprises a second sliding mechanism. The second sliding mechanism comprises four second tracks 34, wherein each of the second walls 33 comprises two second tracks 34. The structure of the two first walls 23 and the two second walls 33 are the same; therefore only one of the first walls 23 and only one of the second walls 33 are shown in FIG. 4A.

Figure 5:
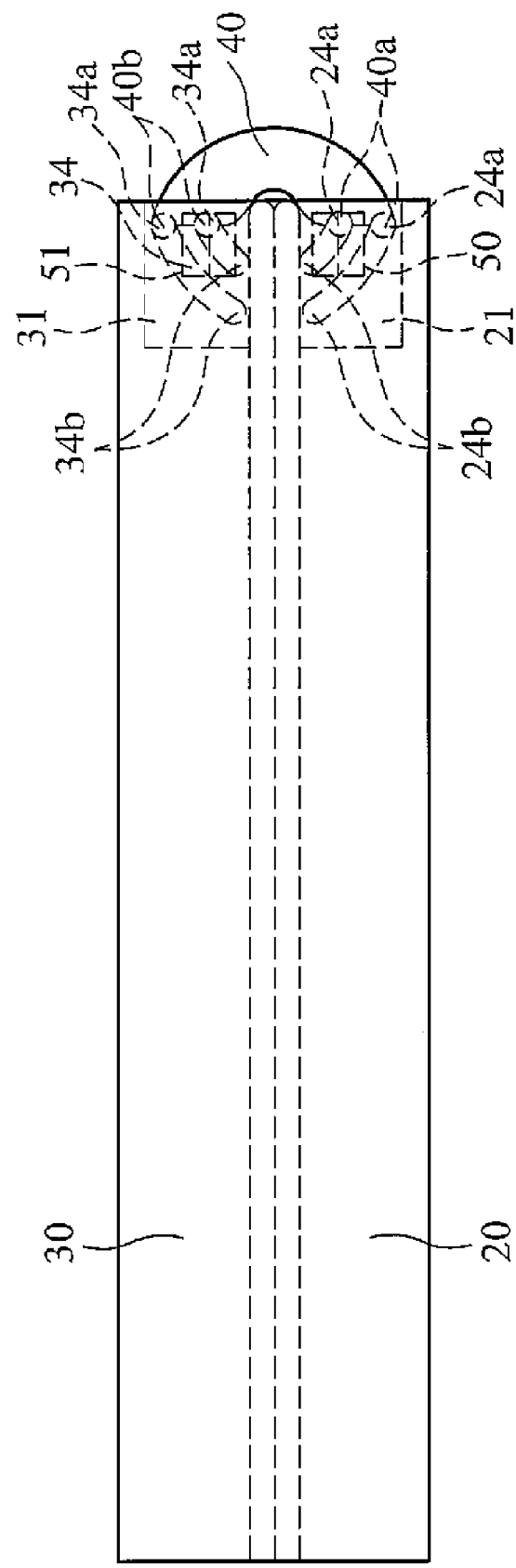
FIG. 5 is a sectional view of the foldable mobile electronic device in FIG. 4A.
Figure 6:
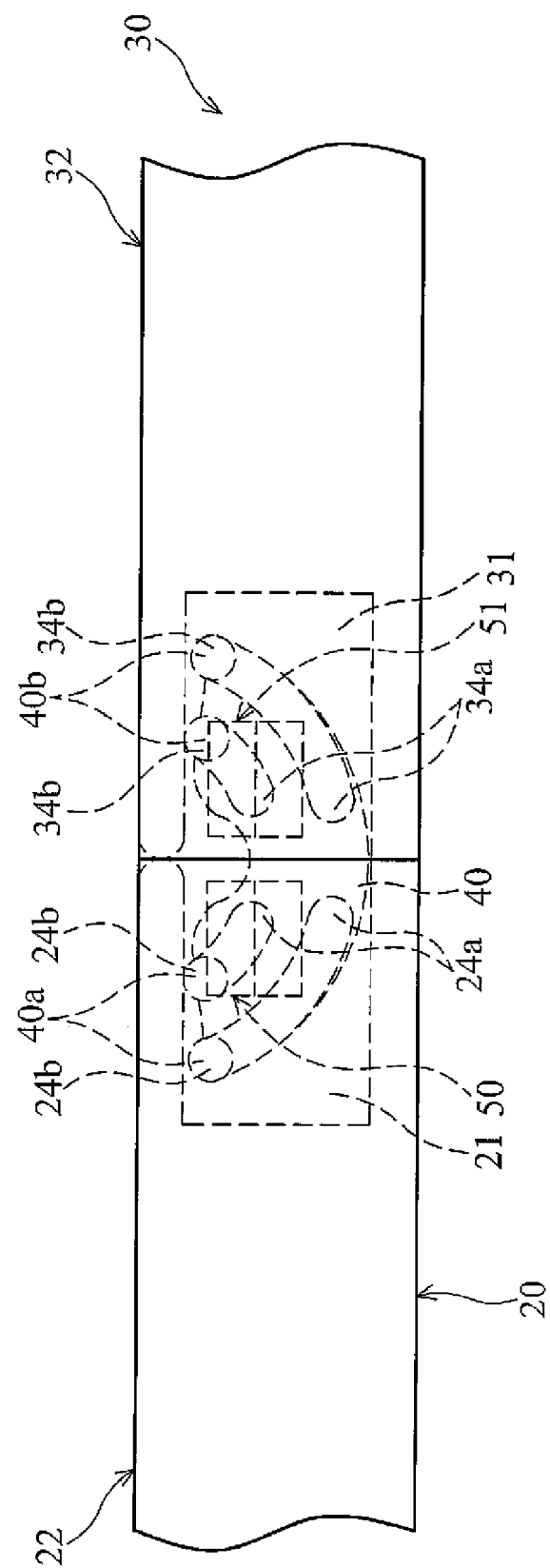
FIG. 6 is a sectional view of the foldable mobile electronic device in FIG. 4B.

In FIG. 4B, the first sliding track 24 corresponds to the second sliding track 34. The hinge 40 comprises a first protrusion corresponding to the first sliding mechanism and a second protrusion corresponding to the second sliding mechanism (close to the first walls and the second walls, respectively). The first protrusion comprises two first protruding members 40a, and the second protrusion comprises two second protruding members 40b. The first protruding members 40a are disposed in the first tracks 24, and the second protruding members 40b are disposed in the second tracks 34. Each of the first tracks 24 comprises a first end 24a and a second end 24b, and each of the second tracks 34 comprises a third end 34a and a fourth end 34b. As shown in FIG. 5, when the top cover 30 is in the first position, the first protruding members 40a of the hinge 40 are disposed on first ends 24a of the first tracks 24, and the second protruding members 40b of the hinge 40 are disposed on the the third end 34a of the second tracks 34. At this time, the hinge 40 extends from the body 20 and the top cover 30 to be exposed. As shown in FIG. 6, when the top cover 30 is in the second position, the first protruding members 40a of the hinge 40 move to the second ends 24b of the first tracks 24, and the second protruding members 40b of the hinge 40 move to the fourth end 34b of the second tracks 34, allowing the hinge 40 to be concealed within the first notch 21 and the second notch 31.

Figure 7:
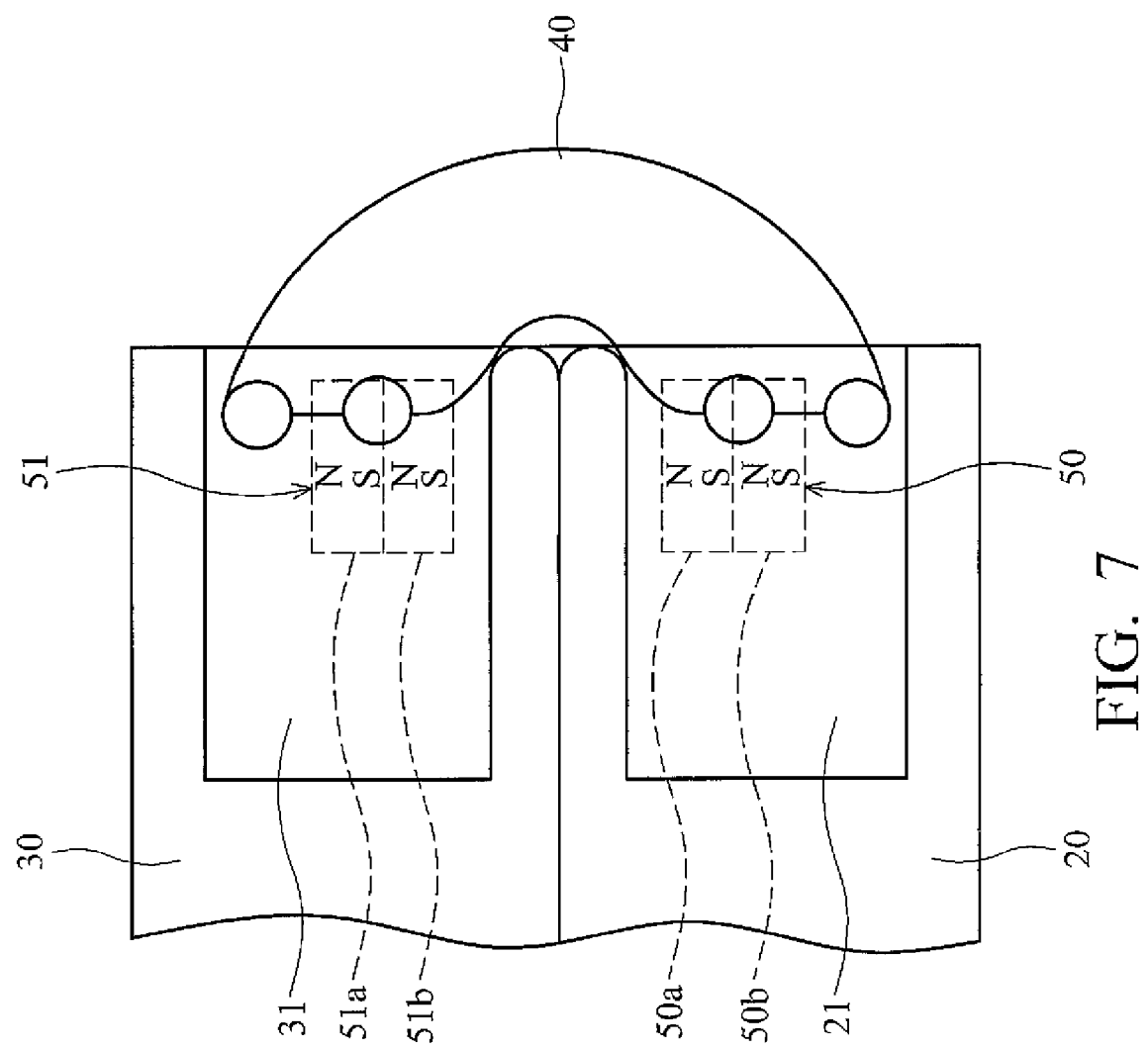
FIG. 7 is a sectional view of the magnet sets in FIG. 4A.

Referring to FIG. 7, a first magnet set 50 is disposed in the first notch 21, and a second magnet set 51 is disposed in the second notch 31. The first magnet set 50 comprises two magnets 50a, 50b, and the second magnet set 51 comprises two magnets 51a, 51b. The magnets 50a and 50b attract each other by positioning opposite poles to each other, and the magnets 51a and 51b attract each other by positioning opposite poles to each other.

Figure 8:
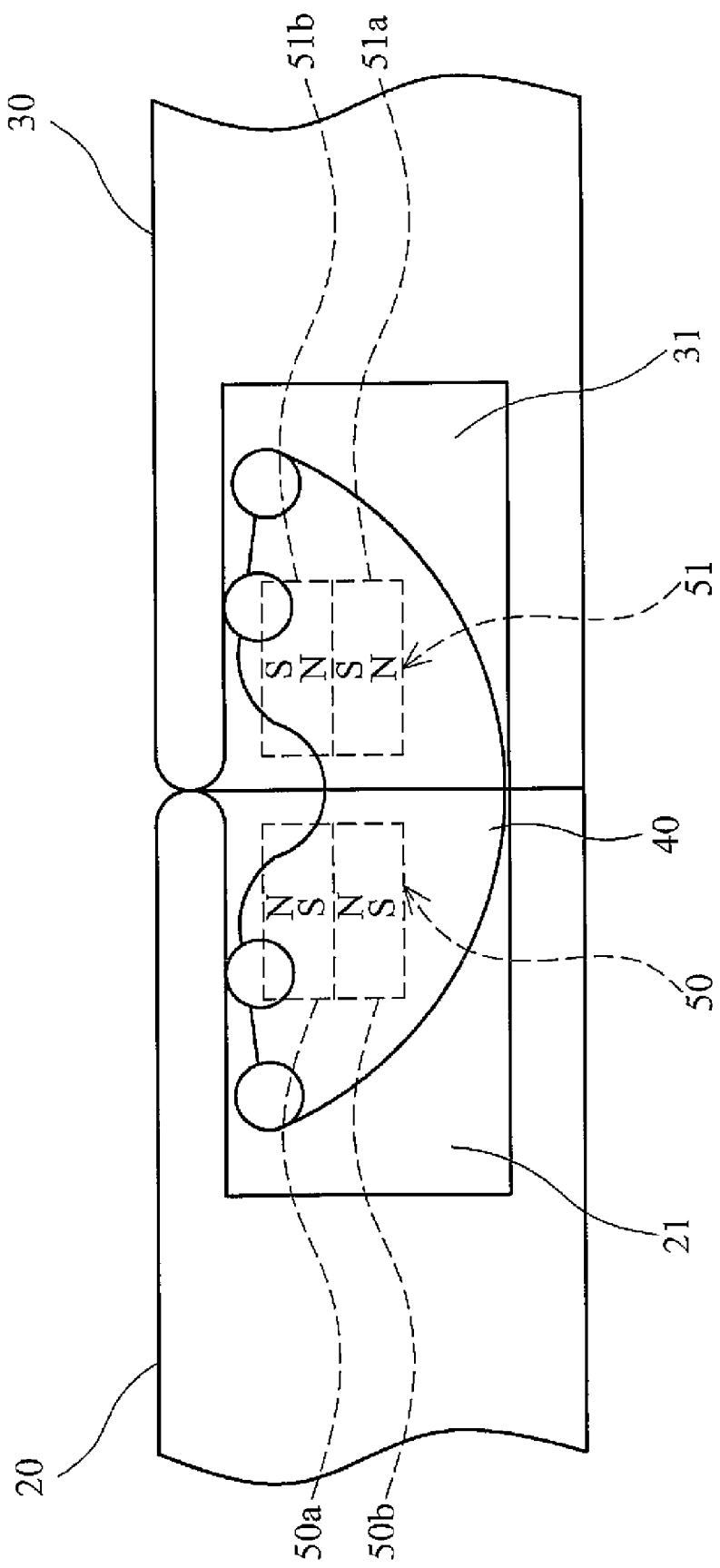
FIG. 8 is a sectional view of the magnet sets in FIG. 4B.

Additionally, tracks are eliminated in FIG. 7 to clearly show the positions of the magnet sets and the hinge. When the top cover 30 is in the first position, the first magnet set 50 and the second magnet set 51 are aligned vertically to attract each other, allowing the body 20 and the top cover 30 to be firmly folded. When the top cover 30 is in the second position (as shown in FIG. 8), the magnets 50a and 50b of the first magnet set 50 switch positions to attract magnets 51a and 51b of the second magnet set 51 with opposite poles, allowing the body 20 and the top cover 30 to be firmly opened. At this time, the magnet set 50 and the second magnet set 51 are substantially covered in the hinge 40.

When in use, the top cover 30 moves to the second position, forming a first coplanar by the first surface 22 of the body 20 and the second surface 32 of the top surface 30, and a second coplanar by the first wall 23 of the body 20 and the second wall 33 of the top cover 30. Furthermore, the first protruding members 40a and the second protruding members 40b of the hinge 40 move the second end 24b of the first tracks 24 and the fourth end 34b of the second tracks 34, positioning the foldable mobile electronic device 10 into an angle 180 degree configuration in the open state.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A foldable mobile electronic device, comprising:
   a body comprising a first surface, a first notch and a first sliding mechanism;
   a top cover comprising a second surface, a second notch and a second sliding mechanism, moving between a first position and a second position relative to the body; and
   a hinge comprising a first protrusion corresponding to the first sliding mechanism and a second protrusion corresponding to the second sliding mechanism; when the top cover moves from the first position to the second position, the first protrusion slides in the first sliding mechanism and the second protrusion slides in the second sliding mechanism;
   wherein when the top cover is in the first position, the hinge extends from the body and the top cover to be exposed, the first notch overlaps the second notch, and the first surface substantially overlaps the second surface, and when the top cover is in the second position, the first notch connects with the second notch and the hinge is accommodated in the first notch and the second notch in the foldable mobile electronic device, and the first surface substantially connects with the second surface such that the first surface and the second surface are coplanar.

2. The foldable mobile electronic device as claimed in claim 1, further comprising a first magnet set and a second magnet set, disposed in the first notch and the second notch, respectively, wherein when the top cover is in the first position, the first magnet set and the second magnet set are aligned vertically and attracted to each other, and when the top cover is in the second position, the first magnet set and the second magnet set are aligned horizontally and attracted to each other.

3. The foldable mobile electronic device as claimed in claim 1, wherein the body further comprises a first wall and the top cover further comprises a second wall, the first sliding mechanism is disposed on the first wall and the second sliding mechanism is disposed on the second wall.

4. The foldable mobile electronic device as claimed in claim 3, wherein when the top cover is in the second position, the first wall of the body and the second wall of the top cover are coplanar.

5. The foldable mobile electronic device as claimed in claim 1, wherein the first sliding mechanism further comprises a plurality of first tracks, and the second sliding mechanism further comprises a plurality of second tracks corresponding to the first tracks.

6. The foldable mobile electronic device as claimed in claim 5, wherein the first protrusion further comprises a plurality of first protruding members, the second protrusion further comprises a plurality of second protruding members, and the first protruding members and the second protruding members are disposed in the first tracks and the second tracks, respectively, when the top cover moves from the first position to the second position, the first protruding members and the second protruding members slide in the first tracks and the second tracks, respectively.

7. The foldable mobile electronic device as claimed in claim 6, wherein each of the first tracks further comprises a first end and a second end, each of the second tracks further comprises a third end and a fourth end, when the top cover is in the first position, the first protruding members of the hinge are disposed on the first ends of the first tracks, and the second protruding members of the hinge are disposed on the first ends of the second tracks; and when the top cover moves to the second position, the first protruding members of the hinge move to the second ends of the first tracks, and the second protruding members of the hinge move to the second ends of the second tracks.

8. A foldable mobile electronic device, comprising:
a body comprising a first notch;
a first magnet set disposed in the body;
a top cover comprising a second notch;
a second magnet set disposed in the top cover; and
a hinge, connected with the body and the top cover, so as to allow the top cover to move between a first position and a second position relatively to the body;
wherein the top cover and the body, due to an attraction between the first magnet set and the second magnet set, are fixed in the first position or the second position,
wherein when the top cover is in the first position, the first notch overlaps the second notch, and when the top cover is in the second position, the first notch connects with the second notch and the hinge is accommodated in the first notch and the second notch.

9. The foldable mobile electronic device as claimed in claim 8, wherein the first magnet set is disposed in the first notch and the second magnet set is disposed in the second notch.

10. The foldable mobile electronic device as claimed in claim 8, wherein the body further comprises a first surface and a first sliding mechanism, the top cover further comprises a second surface and a second sliding mechanism, the hinge further comprises a first protrusion and a second protrusion, and the first protrusion is corresponding to the first sliding mechanism and the second protrusion is corresponding to the second sliding mechanism.

11. The foldable mobile electronic device as claimed in claim 10, wherein when the top cover is in the first position, the hinge extends from the body and the top cover to be exposed, and the first surface substantially overlaps the second surface, and when the top cover is in the second position, the hinge is accommodated in the foldable mobile electronic device, and the first surface substantially connects with the second surface such that the first surface and the second surface are coplanar.

12. The foldable mobile electronic device as claimed in claim 10, wherein the first sliding mechanism further comprises a plurality of first tracks, and the second sliding mechanism further comprises a plurality of second tracks corresponding to the first tracks.

13. The foldable mobile electronic device as claimed in claim 12, wherein the first protrusion further comprises a plurality of first protruding members, the second protrusion further comprises a plurality of second protruding members, and the first protruding members and the second protruding members are disposed in the first tracks and the second tracks, respectively, when the top cover moves from the first position to the second position, the first protruding members and the second protruding members slide in the first tracks and the second tracks, respectively.

14. The foldable mobile electronic device as claimed in claim 13, wherein each of the first tracks further comprises a first end and a second end, each of the second tracks further comprises a third end and a fourth end, when the top cover is in the first position, the first protruding members of the hinge are disposed on the first ends of the first tracks, and the second protruding members of the hinge are disposed on the first ends of the second tracks; and when the top cover moves to the second position, the first protruding members of the hinge move to the second ends of the first tracks, and the second protruding members of the hinge move to the second ends of the second tracks.

15. A foldable mobile electronic device, comprising:
a body comprising a first sliding mechanism and a first notch;
a top cover comprising a second sliding mechanism and a second notch, moving between a first position and a second position relative to the body; and
a hinge comprising a first protrusion corresponding to the first sliding mechanism and a second protrusion corresponding to the second sliding mechanism; when the top cover moves from the first position to the second position, the first protrusion slides in the first sliding mechanism and the second protrusion slides in the second sliding mechanism;
wherein when the top cover is in the first position, the first notch overlaps the second notch and the hinge extends from the body and the top cover to be exposed, and when the top cover is in the second position, the first notch connects with the second notch, the hinge is accommodated in the first notch and the second notch, and the hinge is accommodated in the foldable mobile electronic device.

16. The foldable mobile electronic device as claimed in claim 15, further comprising a first magnet set and a second magnet set, disposed in the first notch and the second notch, respectively, wherein when the top cover is in the first position, the first magnet set and the second magnet set are aligned vertically and attracted to each other, and when the top cover is in the second position, the first magnet set and the second magnet set are aligned horizontally and attracted to each other.

17. The foldable mobile electronic device as claimed in claim 15, wherein the first sliding mechanism further comprises a plurality of first tracks, and the second sliding mechanism further comprises a plurality of second tracks corresponding to the first tracks.

18. The foldable mobile electronic device as claimed in claim 17, wherein the first protrusion further comprises a plurality of first protruding members, the second protrusion further comprises a plurality of second protruding members, and the first protruding members and the second protruding members are disposed in the first tracks and the second tracks, respectively, when the top cover moves from the first position to the second position, the first protruding members and the second protruding members slide in the first tracks and the second tracks, respectively.

* * * * *